US008599457B2

(12) United States Patent
Iwamoto

(10) Patent No.: US 8,599,457 B2
(45) Date of Patent: Dec. 3, 2013

(54) IMAGE PROCESSING DEVICE, METHOD, SYSTEM AND THE ASSOCIATED PROGRAM FOR GENERATING A COMPOSITE IMAGE

(75) Inventor: Yasuhiko Iwamoto, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 895 days.

(21) Appl. No.: 12/394,552

(22) Filed: Feb. 27, 2009

(65) Prior Publication Data
US 2010/0060913 A1    Mar. 11, 2010

(30) Foreign Application Priority Data

Sep. 10, 2008    (JP) .................. 2008-232252

(51) Int. Cl.
  *H04N 1/46*        (2006.01)
  *G06K 9/00*        (2006.01)
  *H04N 7/167*       (2011.01)
(52) U.S. Cl.
  USPC ............ 358/540; 358/1.9; 382/100; 380/201
(58) Field of Classification Search
  None
  See application file for complete search history.

(56) References Cited

U.S. PATENT DOCUMENTS

| 7,548,340 | B2 * | 6/2009 | Ishikawa et al. | 358/1.9 |
| 7,643,667 | B2 * | 1/2010 | Kusakari | 382/149 |
| 2004/0239958 | A1 * | 12/2004 | Nagata et al. | 358/1.2 |
| 2008/0292129 | A1 * | 11/2008 | Fan et al. | 382/100 |

FOREIGN PATENT DOCUMENTS

| JP | A-2000-259758 | 9/2000 |
| JP | A-2002-019221 | 1/2002 |
| JP | A-2002-135556 | 5/2002 |
| JP | 2002-290705 | * 10/2002 |
| JP | A-2002-290705 | 10/2002 |
| JP | A-2006-345017 | 12/2006 |
| JP | 2008-017234 | * 1/2008 |
| JP | A-2008-017234 | 1/2008 |

OTHER PUBLICATIONS

Jun. 19, 2012 Office Action issued in Japanese Patent Application No. 2008-232252 (with English-language translation).

* cited by examiner

*Primary Examiner* — Steven Kau
(74) *Attorney, Agent, or Firm* — Oliff & Berridge, PLC

(57) ABSTRACT

An image processing device, which includes: an original reception unit that receives an original image; a dot image generation unit that generates, on the basis of additive information to be added to the original image, a dot image in which a plurality of dots each formed by one or more pixels are arranged; a state alteration unit that, when any of the dots in the dot image is determined to be not extractable, alters a state of the non-extractable dot on the basis of a relationship between a position on the dot image generated by the dot image generation unit and a corresponding position on the original image; and a composite image generation unit that generates a composite image by superimposing, on the original image, the dot image having the state of the non-extractable dot altered by the state alteration unit.

15 Claims, 17 Drawing Sheets

FIG.6A
| 23 | 20 | 12 | 16 | 24 |
|----|----|----|----|----|
| 15 | 7  | 4  | 8  | 17 |
| 11 | 3  | 0  | 1  | 9  |
| 19 | 6  | 2  | 5  | 13 |
| 22 | 14 | 10 | 18 | 21 |
FIG.6B
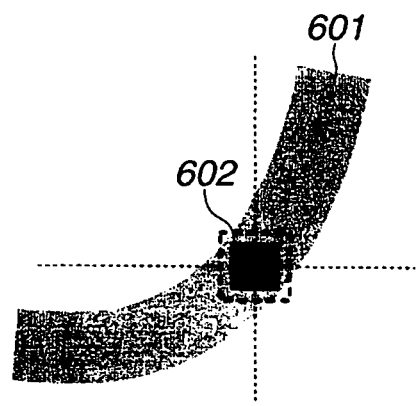
FIG.6C
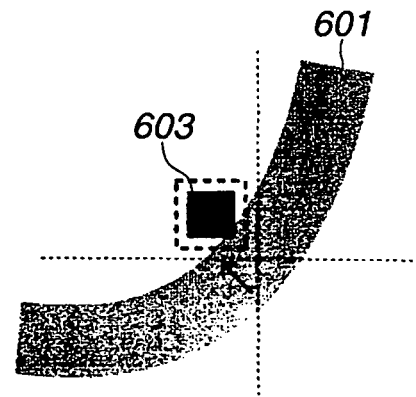

FIG.7A
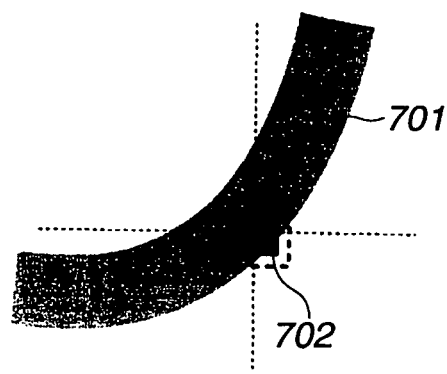
FIG.7B
| 240 | 244 | 229 | 232 | 180 | 99 | 48 |
|---|---|---|---|---|---|---|
| 234 | 233 | 226 | 225 | 180 | 78 | 65 |
| 222 | 220 | 217 | 203 | 192 | 88 | 16 |
| 185 | 199 | 210 | 198 | 140 | 19 | 17 |
| 156 | 119 | 190 | 150 | 70 | 22 | 19 |
| 176 | 134 | 185 | 50 | 26 | 15 | 13 |
| 165 | 22 | 22 | 14 | 10 | 12 | 10 |
FIG.7C
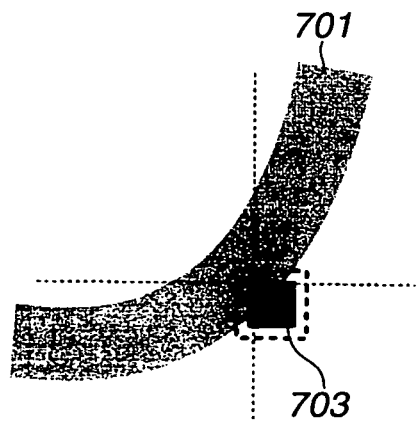

IMAGE PROCESSING DEVICE, METHOD, SYSTEM AND THE ASSOCIATED PROGRAM FOR GENERATING A COMPOSITE IMAGE

CROSS-REFERENCE TO RELATED APPLICATION

This application is based on and claims priority under 35 USC 119 from Japanese Patent Application No. 2008-232252 filed on Sep. 10, 2008.

BACKGROUND

Technical Field

The present invention relates to an image processing device, an image processing system, an image processing method, a recording medium storing a program, and a data signal.

SUMMARY

An image processing device, which includes: an original reception unit that receives an original image; a dot image generation unit that generates, on the basis of additive information to be added to the original image, a dot image in which a plurality of dots each formed by one or more pixels are arranged; a state alteration unit that, when any of the dots in the dot image is determined to be not extractable, alters a state of the non-extractable dot on the basis of a relationship between a position on the dot image generated by the dot image generation unit and a corresponding position on the original image; and a composite image generation unit that generates a composite image by superimposing, on the original image, the dot image having the state of the non-extractable dot altered by the state alteration unit.

BRIEF DESCRIPTION OF THE DRAWINGS

Exemplary embodiments of the present invention will be described in detail based on the following figures, wherein:

FIGS. 6A to 6C are schematic diagrams showing processing performed by a displacement pattern memory unit 309 to alter the position of a dot;

FIGS. 7A to 7C are schematic diagrams showing processing performed by an original density detection unit 310 to alter the position of a dot;

DETAILED DESCRIPTION

Exemplary embodiments of the present invention will be described with reference to the accompanying drawings.

First, a configuration of units for generating a composite image will be described with reference to FIG. 1.

Figure 1:
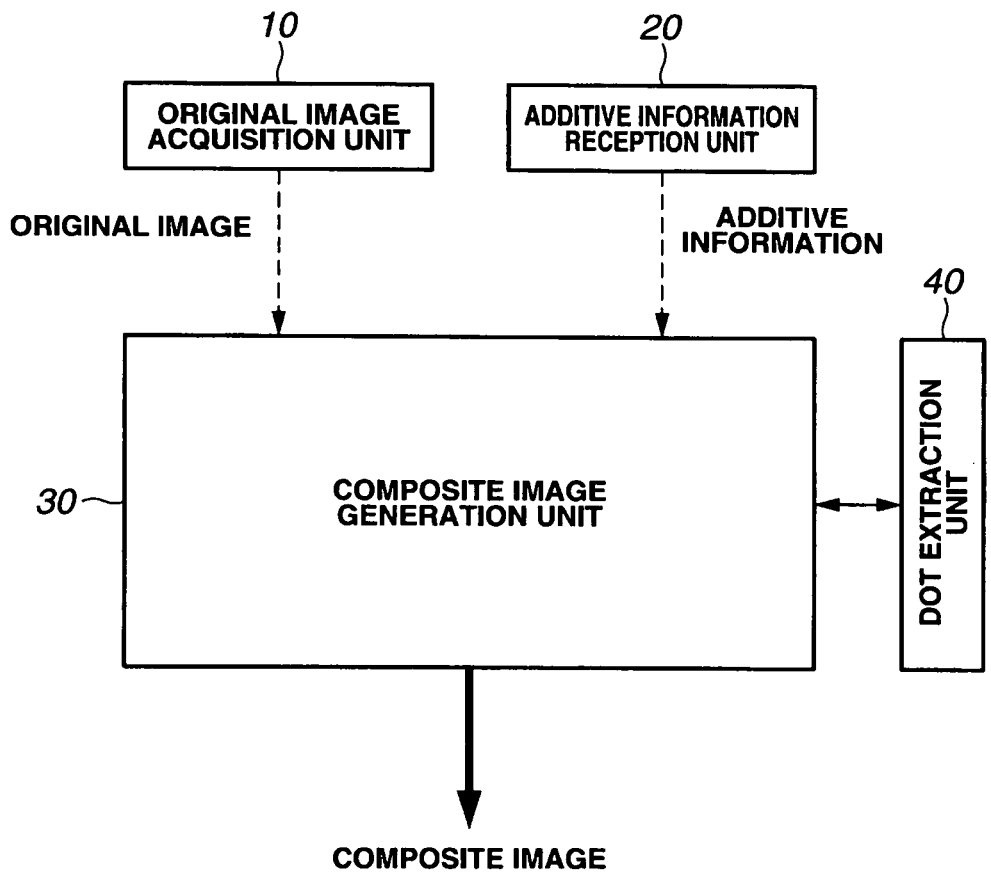
FIG. 1 is a block diagram showing units for generating a composite image.

FIG. 1 is a block diagram showing a configuration of units for generating a composite image. These units are to be mounted on a personal computer, an image formation device or the like serving as a composite image processing device.

As shown in FIG. 1, the units for generating a composite image include an original image acquisition unit 10, an additive information reception unit 20, a composite image generation unit 30, and a dot extraction unit 40.

A composite image processing device according to the present invention includes the composite image generation unit 30.

The original image acquisition unit 10 acquires an original image in which additive information is to be embedded.

The original image acquisition unit 10 may be formed by a scanner for acquiring image data, or by various types of memory devices for storing image data.

When the original image acquisition unit 10 is formed by a scanner, the original image acquisition unit 10 acquires an original image in the form of image data from an original document placed on the scanner.

The additive information reception unit 20 has a function to receive additive information to be added to the original image, and is formed for example by a keyboard as an input device for a personal computer, or by an input key 202 as an input device for an image formation device.

With the original image acquired by the original image acquisition unit 10 and the additive information input by the additive information reception unit 20, the composite image generation unit 30 generates a dot image from the additive information, and generates a composite image by superimposingly synthesizing the dot image and the original image.

The dot image generated from the additive information is an image formed by a plurality of dots (black round spots), in which the additive information is represented by the arrangement of a plurality of dots.

The dot extraction unit 40 performs processing to extract dots from an image in which the dots are superimposed to an original image.

The dot extraction unit 40 also reads additive information from the extracted dots.

Figure 2A:
FIGS. 2A to 2C are schematic diagrams showing examples of systems for generating a composite image.

When the system is formed by a scanner 203 and a personal computer 204, as shown in FIG. 2A, for example, the scanner 203 serves the function of the original image acquisition unit 10, a keyboard as an input device for the personal computer 204 serves the function of the additive information reception unit 20, and the CPU (Central Processing Unit) and a memory device of the personal computer 204 serve the functions of the composite image generation unit 30 and the dot extraction unit 40. An image processing program is stored in the memory device of the personal computer 204, and the personal computer 204 serves as the image processing device.

When using the system formed by the scanner 203 and the personal computer 204, the user places a desired original document on the scanner 203, and inputs desired additive information from the keyboard of the personal computer. The personal computer 204 generates a dot image from the input additive information and generates a composite image of the original image and the dot image.

Figure 2B:
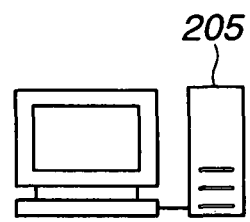

When the system is formed only by a personal computer 205 as shown in FIG. 2B, for example, an memory device of the personal computer 205, which stores an image data, serves the function of the original image acquisition unit 10, a keyboard as an input device of the personal computer 205 serves the function of the additive information reception unit 20, and a CPU and a memory device of the personal computer 205 serve the functions of the composite image generation unit 30 and the dot extraction unit 40. An image processing program is stored in the memory device of the personal computer 205, and the personal computer 205 serves as the image processing device.

When using the system formed only by the personal computer 205, the user selects a desired original image, to which additive information is to be added, from image data (which may be an image file or a document file) stored in the memory device of the personal computer 205, and inputs the additive information from the keyboard. The personal computer 205 generates a dot image from the input additive information, and generates a composite image of the original image and the generated dot image.

Figure 2C:
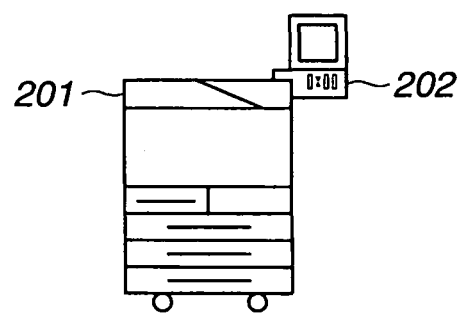

Further, when the system is formed by only an image formation device as shown in FIG. 2C, for example, a scanner 201 of the image formation device serves the function of the original image acquisition unit 10, an input key 202 as an input device of the image formation device serves the function of the additive information reception unit 20, a CPU and a memory device of the image formation device serve the functions of the composite image generation unit 30 and the dot extraction unit 40. An image processing program is stored in the memory device of the image formation device, and the image formation device serves as the image processing device.

When using the system formed by only the image formation device, the user places a desired original document to which additive information is to be added on the scanner 201 of the image formation device, and inputs desired additive information from the input key 202. The image formation device reads the original document placed on the scanner 20, generates a dot image from the input additive information, generates a composite image of the original image and the dot image, and prints out the composite image on paper.

In the following examples, a description will be made, including a dot state alteration unit 308 of the composite image generation unit 30, which has different functions and configurations.

Dot state alteration units 308, 308-1 and 308-2 have a function to alter the state of dots in a dot image generated by the dot image generation unit 302.

Description of a First Example will be made of the composite image generation unit 30 having the dot state alteration unit 308. The dot state alteration unit 308 performs the alteration of the state of dots by displacing the position of the dots.

Description of a Second Example will be made of the composite image generation unit 30 having the dot state alteration unit 308-1. The dot state alteration unit 308-1 performs the alteration of the state of dots by altering the color of the dots.

Description of a Third Example will be made of the composite image generation unit 30 having the dot state alteration unit 308-2. The dot state alteration unit 308-2 performs the alteration of the state of dots by altering the shape of the dots.

FIRST EXAMPLE

Functions of the composite image generation unit 30 will be described with reference to FIG. 3.

Figure 3:
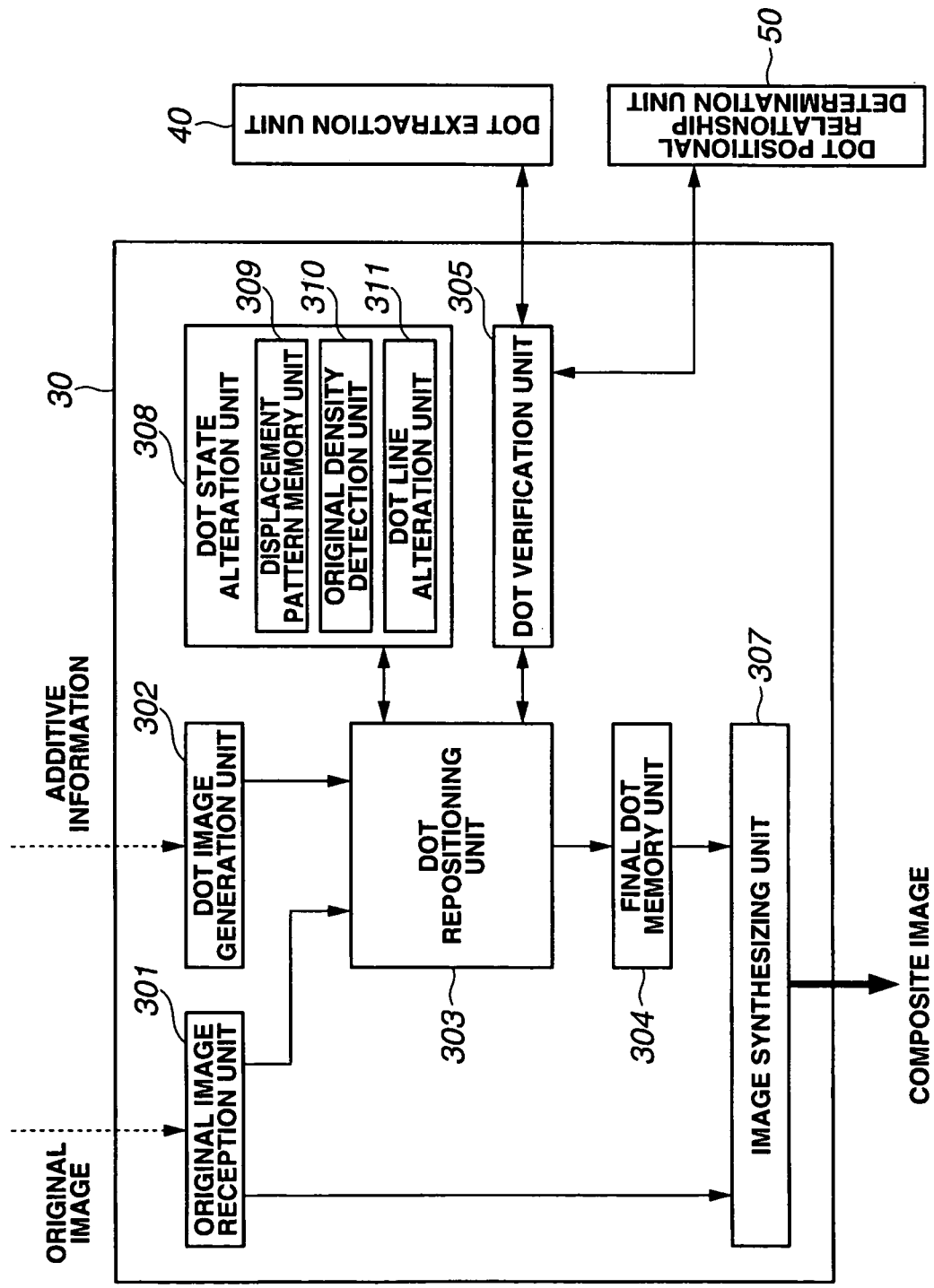
FIG. 3 is a block diagram showing a composite image generation unit 30 having a dot state alteration unit 308.

FIG. 3 is a block diagram showing functions of the composite image generation unit 30.

As shown in FIG. 3, the composite image generation unit 30 includes an original image reception unit 301, a dot image generation unit 302, a dot repositioning unit 303, a final dot memory unit 304, a dot verification unit 305, an image synthesizing unit 307, a dot state alteration unit 308, a displacement pattern memory unit 309, an original density detection unit 310, and a dot line alteration unit 311.

The original image reception unit 301 acquires an original image from the original image acquisition unit 10.

The dot image generation unit 302 generates a dot image based on the additive information received from the additive information reception unit 20.

The dot repositioning unit 303 stores a dot image in which the dot position is altered by the dot state alteration unit 308.

The final dot memory unit 304 acquires, from the dot repositioning unit 303, a dot image in which the alteration of the dot position is completed by the dot state alteration unit 308, and transmits this dot image to the image synthesizing unit 307.

The dot verification unit 305 has a function to verify whether or not dots on an original image made by synthesis between an original image and a dot image can be extracted. The dot verification unit 305 sends an original image having dots arranged thereon and verifies whether or not the dots can be extracted by the dot extraction unit 40.

The dot verification unit 305 also has a function to verify whether or not a dot whose position has been altered by the dot state alteration unit 308 is made extractable by the alteration of position. The dot verification unit 305 sends image data in which a dot whose position is altered is arranged on an original image to the dot extraction unit 40, and verifies whether or not the dot can be extracted by the dot extraction unit 40.

The dot verification unit 305 may verify the extractability of a dot by other methods as well. For example, positional information of a dot in a dot image is sent together with an original image from the dot verification unit 305 to the dot positional relationship determination unit 50, and the dot positional relationship determination unit 50 determines whether or not the dot can be extracted on the basis of the positional relationship between to the dot image and the original image, and the result of this determination is acquired by the dot verification unit 305 to provide a verification result. The dot positional relationship determination unit 50 is not included in the composite image generation unit 30, but is provided in a composite image processing device having the composite image generation unit 30, as a separate component for generating a composite image.

Description will be made of a function of the dot positional relationship determination unit 50 with reference to FIGS. 4A and 4B.

Figure 4:
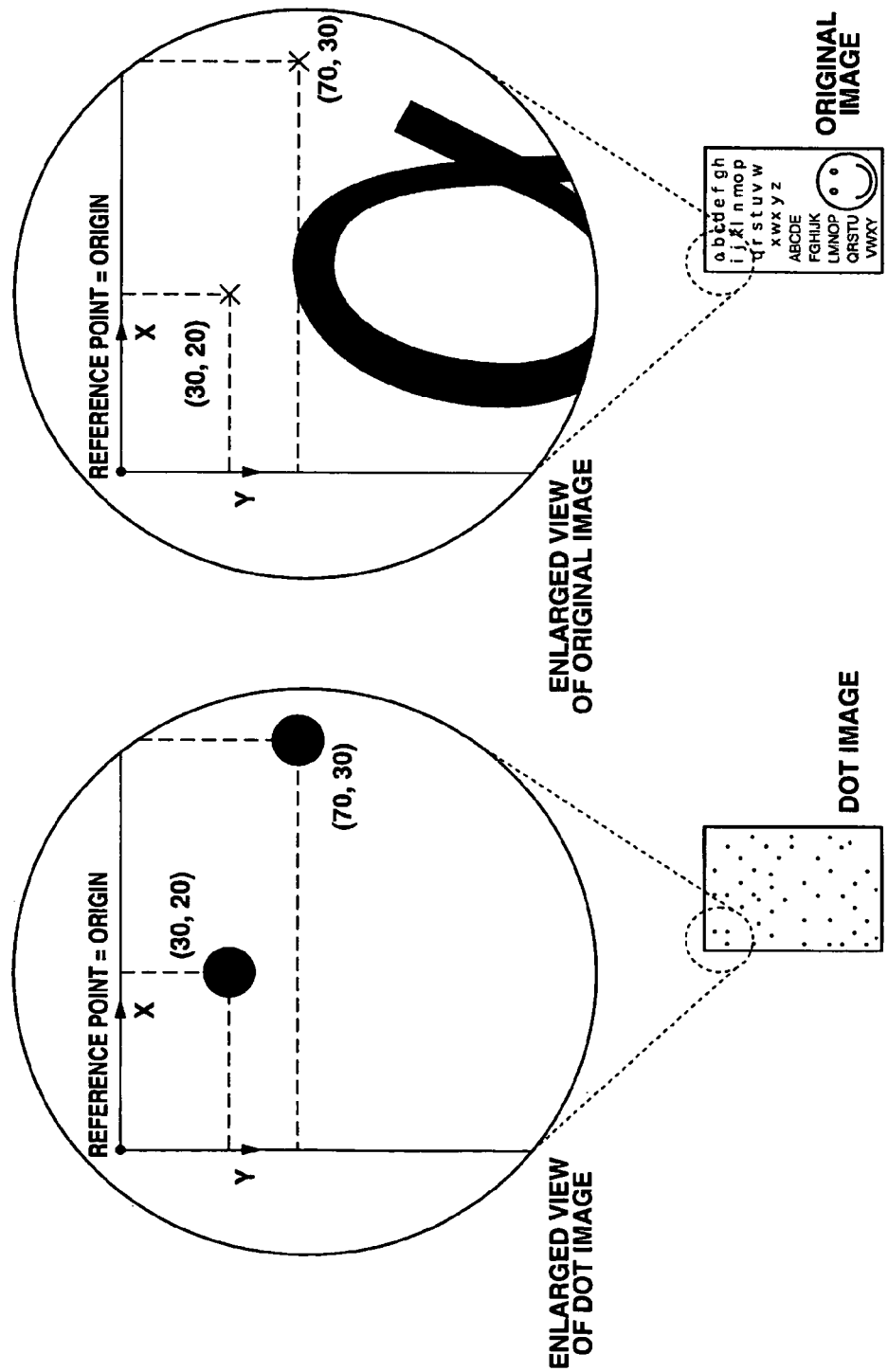
FIGS. 4A and 4B are schematic diagrams showing processing performed by a dot positional relationship determination unit 50.

FIGS. 4A and 4B are schematic diagrams showing how the dot positional relationship determination unit 50 determines about the extractability of dots. FIG. 4A is a schematic diagram showing the positions of dots in a dot image, FIG. 4B is a schematic diagram showing the positions of the same dots in the original image.

As shown in FIG. 4A, the dot positional relationship determination unit 50 determines the positions of dots.

The position of each dot is determined as a coordinate value expressed in units of pixels in an X-Y plane with the upper left end point of the dot image being defined as the origin.

For example, as shown in FIG. 4A, one dot is represented by the coordinate (3, 2), while another dot is represented by the coordinate (7, 3).

Once the coordinate values of the dots in the dot image are obtained, as shown in FIG. 4B, it is checked whether or not the original image and the obtained dots are matched on the positions of the coordinates of the dots in an X-Y plane expressed in units of pixels with the upper left endpoint of the original image being defined as the origin.

If the original image is arranged on the position of the coordinate of a dot, it is determined that the dot overlaps with the original image and hence cannot be extracted.

A dot sometimes comprises a plurality of pixels. In such a case, the coordinate of the center point of the dot may be determined, and then the dot is determined to be not extractable if the original image exists within a range of a radius corresponding to n (n is a value predetermined according the size or shape of the dot) pixels from the coordinate of the center point of the dot.

Returning to the description of FIG. 3, the dot extraction unit 40 extracts dots from the composite image.

The dot state alteration unit 308 has a function to alter the position of a dot that cannot be extracted by the dot verification unit 305, and includes a displacement pattern memory unit 309, an original density detection unit 310, and a dot line alteration unit 311.

The displacement pattern memory unit 309 stores a displacement pattern for altering the positions of dots. The displacement pattern indicates, as shown in FIG. 6A, destination pixel positions in sequence with the initial dot position being placed at the center (the details will be described later with reference to FIGS. 6A to 6C).

The original density detection unit 310 has a function to find density distribution of the original image around the position where each dot is arranged when the dot image generated by the dot image generation unit 302 is superimposed on the original image (the details will be described later with reference to FIGS. 6A to 6C and FIGS. 7A to 7C).

The dot line alteration unit 311 has a function to displace dots included in a certain row of the dot image generated by the dot image generation unit 302.

In the composite image generation unit 30 configured in this manner, an original image is obtained from the original image acquisition unit 10, and the dot image generation unit 302 generates a dot image having dots arranged at equal intervals on the basis of additive information received from the additive information reception unit 20.

Then, the original image and the dot image generated by the dot image generation unit 302 are synthesized by the dot repositioning unit 303, and the dots on the synthesized image data are verified by the dot verification unit 305. The states (the positions in the First Example) of those dots that are determined to be not extractable are altered by the dot state alteration unit 308.

The dots whose state (the position in the First Example) is altered are repositioned in a dot image by the dot repositioning unit 303.

Once the verification of the dot image generated by the dot image generation unit 302 is completed by the dot verification unit 305, the dot image as obtained by the repositioning of dots by the repositioning unit 303 at the time of completion of the verification is sent to the final dot memory unit 304 as a final dot image.

The image synthesizing unit 307 synthesizes the original image acquired by the original image reception unit 301 and the dot image sent to the final dot memory unit 304 to generate a composite image.

Description will be made of how an original image and a dot image are synthesized, with reference to FIG. 5.

Figure 5:
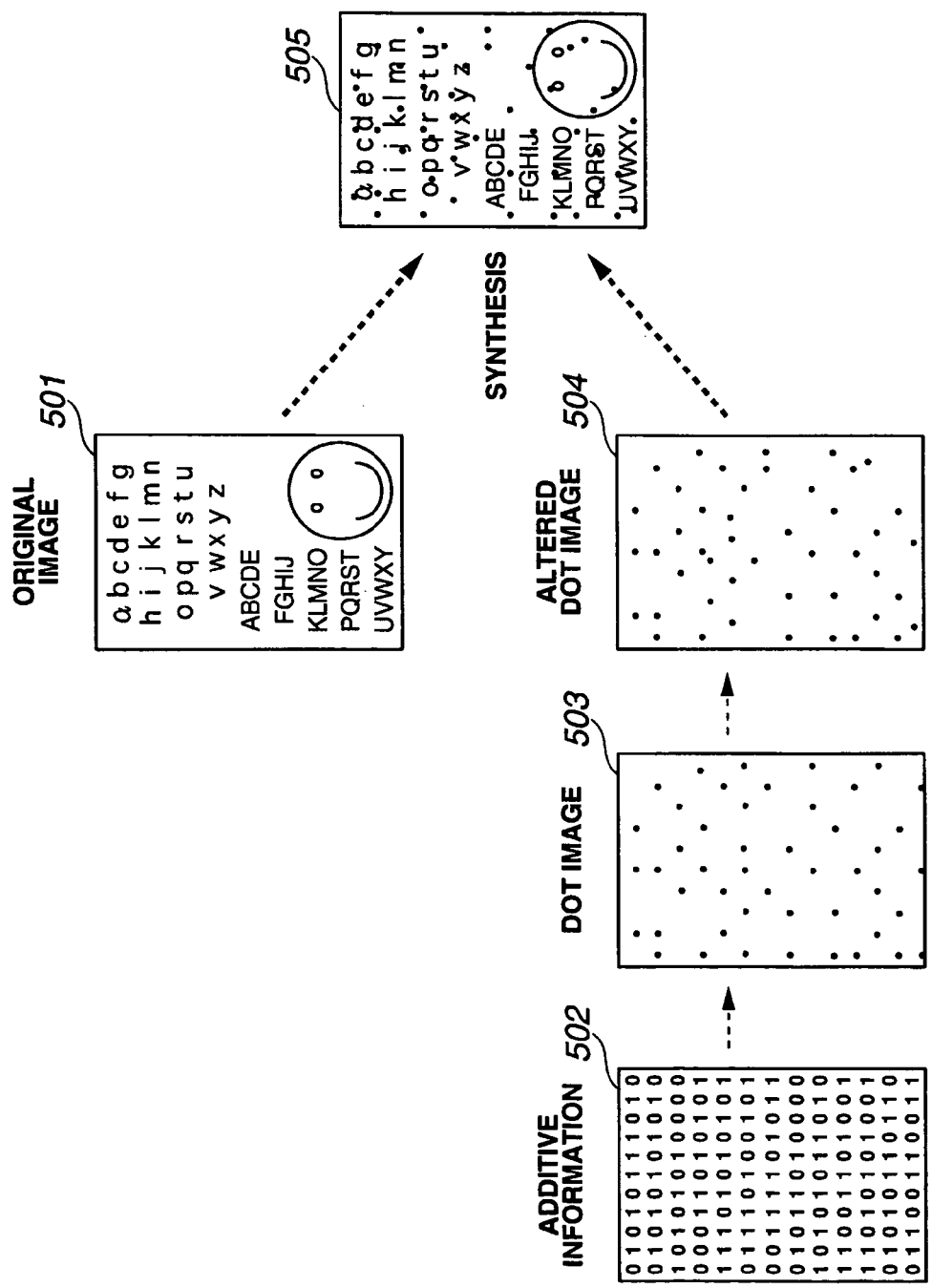
FIG. 5 is a schematic diagram showing how an original image and a dot image are synthesized.

FIG. 5 is a schematic diagram showing how an original image and a dot image are synthesized.

As shown in FIG. 5, additive information received by the additive information reception unit 20 is converted into digital information, whereby numbers "0" and "1" are arranged on the image data (indicated by the reference numeral 502).

Dots are arranged at the positions corresponding to "1", whereby a dot image formed by a plurality of dots is generated (indicated by the reference numeral 503).

A dot is represented by a black round spot (circle) as described in relation to FIG. 1. This dot does not mean a pixel as constituent units of a digital image.

The dot may be a black round circle formed by either a single pixel or a plurality of pixels.

A plurality of such dots are arranged to form a dot image as indicated by the reference numeral 503.

The processing to generate a dot image from additive information is performed by the dot image generation unit 302.

The positions of the dots in the dot image generated above are altered by the composite image generation unit 30, and the dot image is finally determined as final image data (which is sent to the final dot memory unit 304 and indicated by the reference numeral 504). This dot image and the original image (indicated by the reference numeral 501) are synthesized to generate a composite image (indicated by the reference numeral 505).

Description will be made of processing to alter the position of a dot with reference to FIGS. 6 to 9.

First, referring to FIG. 6A to FIG. 6C, description will be made of processing to alter the positions of dots on the basis of a displacement pattern stored in the displacement pattern memory unit 309 of the dot state alteration unit 308.

FIGS. 6A to 6C are schematic diagrams illustrating processing to alter the position of a dot on the basis of a displacement pattern stored in the displacement pattern memory unit 309. FIG. 6A is a schematic diagram showing an example of a displacement pattern. FIG. 6B is a schematic diagram showing a dot that exists on the original image and is determined, by the dot verification unit 305, to be not extractable, and FIG. 6C is a schematic diagram showing a dot that is determined to be not extractable and is displaced according to the displacement pattern shown in FIG. 6A.

As shown in FIG. 6A, the displacement pattern memory unit 309 stores a dot displacement pattern in which numbers indicate the sequence for displacing a dot.

In a first displacement, for example, a dot is displaced rightward from a pixel indicated by "0" to a pixel indicated by "1" by one pixel. The unit of displacement is not limited to one pixel. While the numbers in the displacement pattern indicate the order of the dot displacement, the dot may be displaced by either two or three pixels. Specifically, the rightward displacement from "0" to "1" may mean a displacement by two pixels or a displacement by three pixels.

Further, although the displacement pattern shown in FIG. 6A is of a size of 5×5 cells, the size of the displacement pattern is not limited to this.

The dot is displaced in accordance with this displacement pattern to find a position where the dot verification unit 305 determines that the dot is extractable.

For example, as shown in FIG. 6B, when the region where the dot arranged by the dot image generation unit 302 (indicated by the reference numeral 602) overlaps with image data in the original image (indicated by reference numeral 601) is so large that the dot verification unit 305 determines that the dot (indicated by the reference numeral 602) cannot be extracted, the dot is displaced in accordance with the displacement pattern of FIG. 6A.

As a result of the displacement in seven times in accordance with the displacement pattern, the dot verification unit 305 determines that the dot becomes extractable, and this position is determined as the final displacement position of the dot (indicated by the reference numeral 603 in FIG. 6C).

Description will be made, with reference to FIGS. 7A to 7C, of processing to displace dots on the basis of densities of an original image detected by the original density detection unit 310.

FIGS. 7A to 7C are schematic diagrams showing processing to displace a dot on the basis of densities of an original image detected by the original density detection unit 310. FIG. 7A is a schematic diagram showing a dot arranged in the original image before displacement of the dot. FIG. 7B is a schematic diagram showing densities of the original image around the dot as detected by the original density detection unit 310. FIG. 7C is a schematic diagram showing the dot that is displaced according to the densities of the original image.

For example, as shown in FIG. 7A, when the original image (indicated by the reference numeral 701) overlaps with the dot image (indicated by the reference numeral 702) and it is determined by the dot verification unit 305 that the dot cannot be extracted, the original density detection unit 310 of the dot state alteration unit 308 detects original densities of the original image around the non-extractable dot.

The original densities are detected in the region of the original image overlapping with the non-extractable dot and the region around this dot.

The original densities thus detected are indicated for each pixel as shown in FIG. 7B. The dot state alteration unit 308 determines a position where the original density is low, and displaces the dot toward that low density position (as indicated by the arrow in FIG. 7B) (FIG. 7C).

The position to which the dot is displaced is stored, and the displaced dot is rearranged in a new dot image by the dot repositioning unit 303.

The regions in the original image where the densities are detected as shown in FIG. 7B are not limited to the region where the original image overlaps with the dot and the region around the dot. The density may be detected only in the region where the original image overlaps with the dot.

Description will be made, with reference to FIGS. 8A and 8B, of processing to displace a row of dots by the dot line alteration unit 311.

Figure 8A:
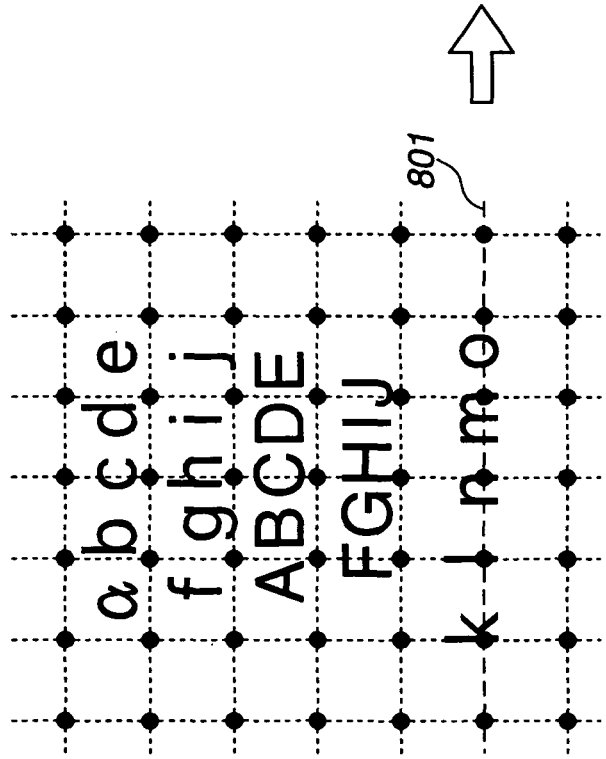
FIGS. 8A and 8B are schematic diagrams showing processing performed by a dot line alteration unit 311 to alter the position of a row of dots.
Figure 8B:
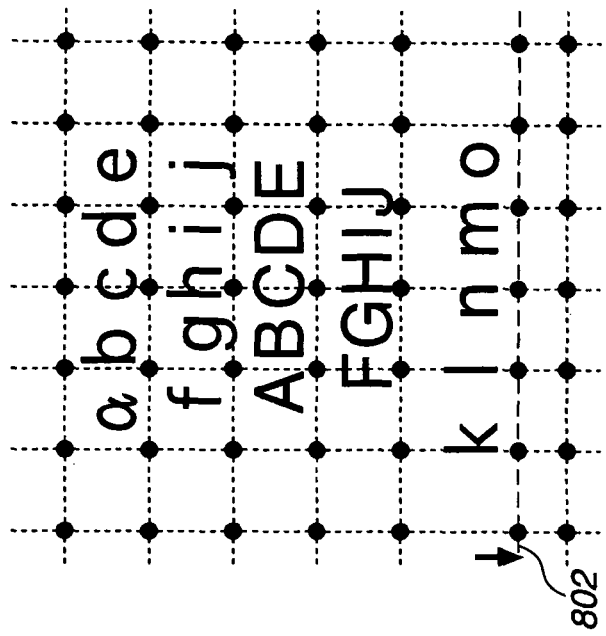

FIGS. 8A and 8B are schematic diagrams showing processing to displace a row of dots by the dot line alteration unit 311.

The dot line alteration unit 311 displaces a row of dots when dots cannot be displaced to an extractable position either by the displacement of the dots according to the displacement pattern stored in the displacement pattern memory unit 309, or by the displacement of the dots according to the original densities detected by the original density detection unit 310.

As shown in FIG. 8A, the dots in the row 801 are located at a position overlapped with the original image and are not extractable. When the dots cannot be displaced to an extractable position by displacing the dot by the displacement pattern memory unit 309 or the original density detection unit 310, they are displaced in row by the dot line alteration unit 311.

The dots in the row 801 shown in FIG. 8A are collectively displaced by the dot line alteration unit 311 to a position of a dot row 802 as shown in FIG. 8B.

Next, referring to FIG. 9, description will be made of processing to generate a composite image, including the processing to alter the positions of dots by the dot state alteration unit 308.

Figure 9:
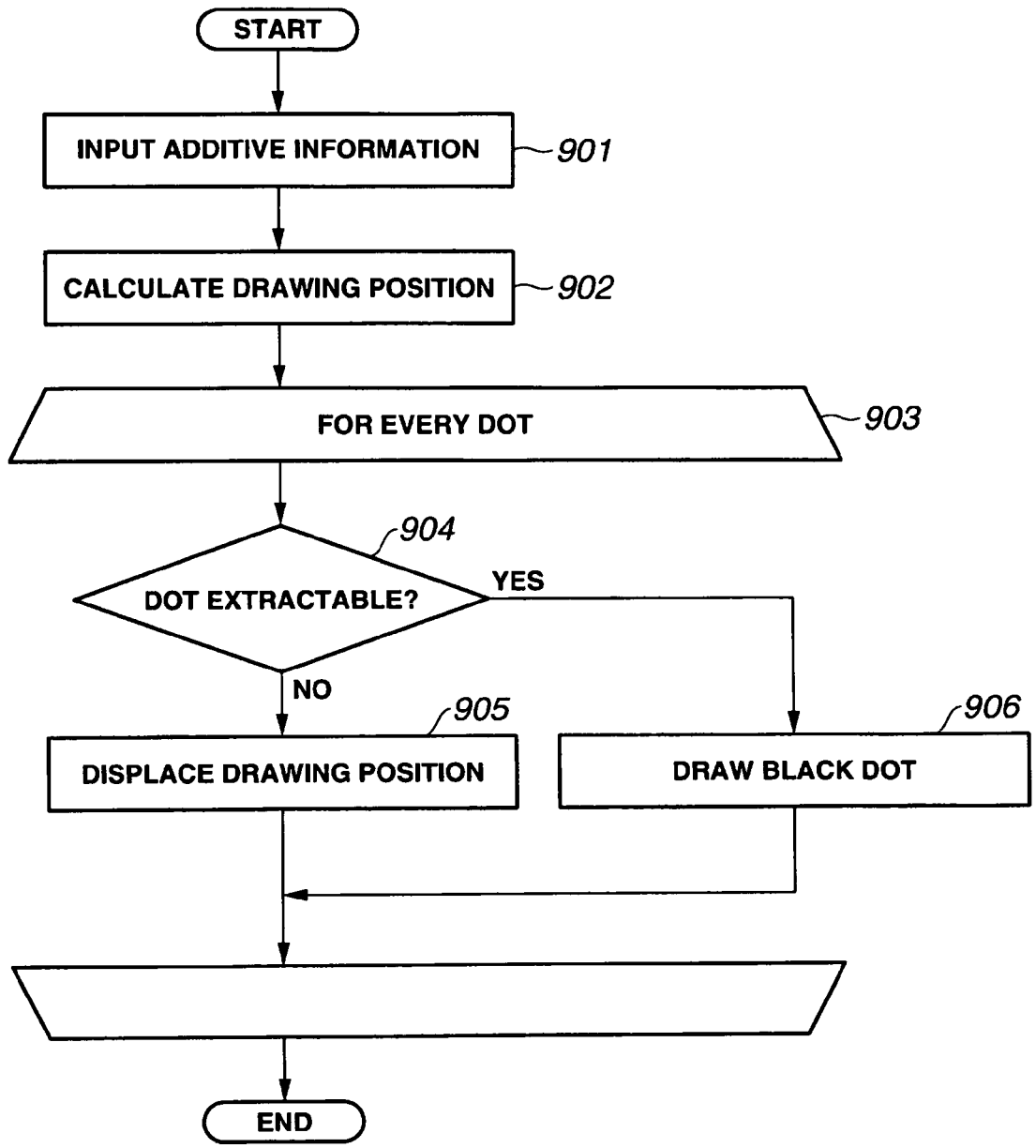
FIG. 9 is a flowchart showing processing to generate a composite image in a First Example of the invention.

FIG. 9 is a flowchart showing processing to generate a composite image.

When acquiring additive information from the additive information reception unit 20 (step 901), the dot image generation unit 302 generates a dot image on the basis of on the additive information.

The processing to generating a dot image on the basis of additive information is performed, as shown in FIGS. 4A and 4B, by converting the additive information into digital data of "0" and "1", drawing the additive information converted into the digital data of "0" and "1" on paper (indicated by the reference numeral 502 in FIG. 5), and generating a dot image such that dots are drawn on paper at positions corresponding to the digital data of "1" (indicated by the reference numeral 503 in FIG. 5).

Once a dot image is thus generated (step 902), the dot image is synthesized with an original image acquired from the original image reception unit 301. The dots in the dot image synthesized with the original image are checked by the dots verification unit 305, dot by dot, to determine whether or not the dot can be extracted (step 903).

When the dot image is synthesized with the original image, the drawn dots possibly become non-extractable, overlapping with a solid part or a part of characters in the original image.

If a dot is determined to be extractable by the dot verification unit 305 (YES in step 904), the dot keeps the same position as the position where the dot image is generated by the dot image generation unit 302 (step 906).

If a dot is determined to be not extractable by the dot verification unit 305 (NO in step 904), the position of that dot is altered by the dot state alteration unit 308 (step 905).

If the positions of the non-extractable dots cannot be altered by the displacement pattern memory unit 309 and the original density detection unit 310 during the alteration of the dot positions, then the alteration of position is performed by the dot line alteration unit 311 that alters the position of a row of dots drawn in the dot image.

In this manner, if any dots in the dot image generated by the dot image generation unit 302 cannot be extracted due to the overlapping with the original image, the positions of these dots are altered, and a composite image is generated by synthesizing the dot image and the original image.

Description will be made, with reference to FIG. 10, of processing to extract additive information from a composite image in which a dot image and an original image are synthesized.

Figure 10:
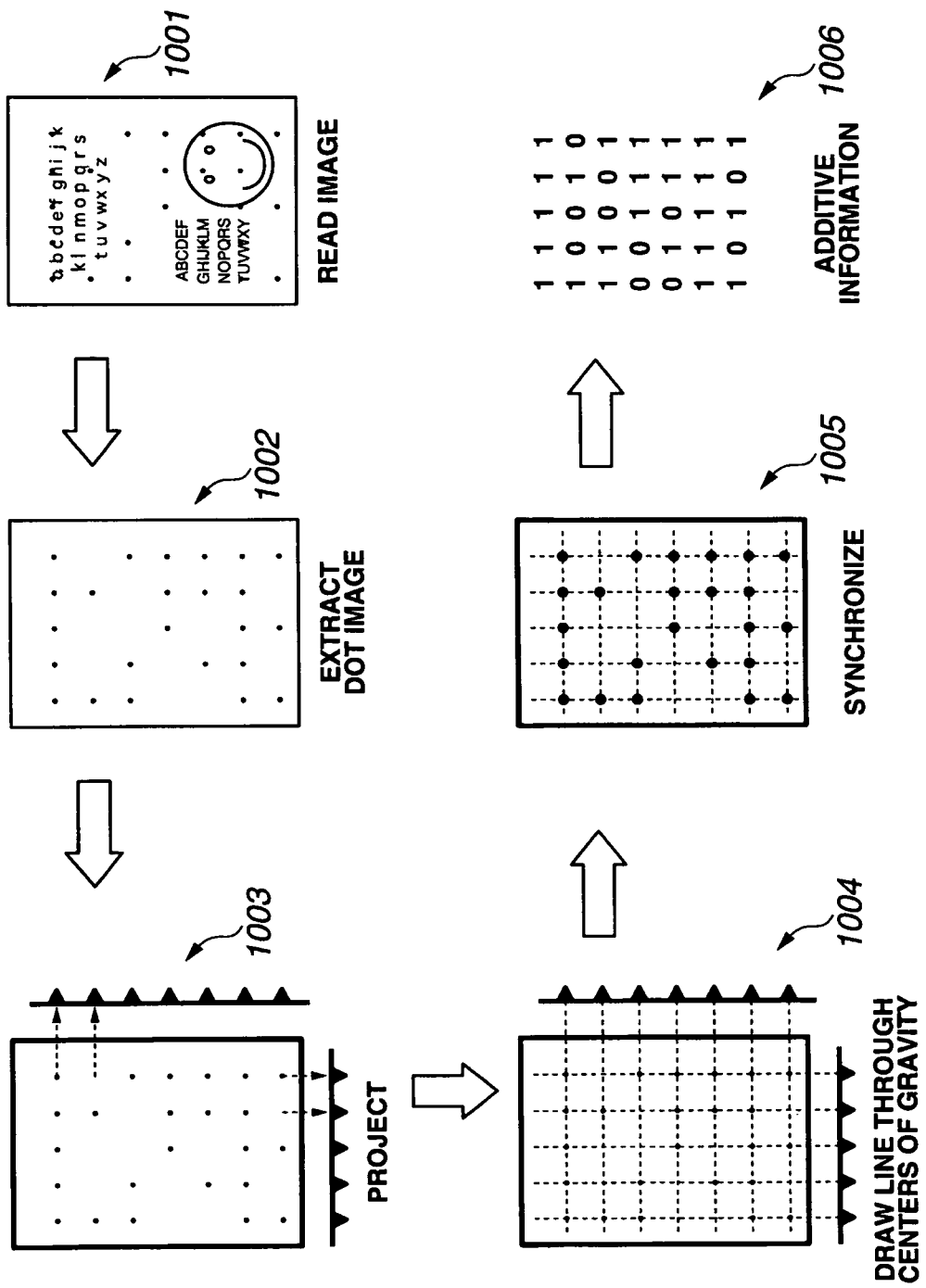
FIG. 10 is a schematic diagram showing processing to extract additive information from a composite image.

FIG. 10 is a schematic diagram showing processing to extract additive information from a composite image.

A composite image is fed to the dot extraction unit 40 (indicated by the reference numeral 1001), and dots are extracted from the composite image by the dot extraction unit 40 (indicated by the reference numeral 1002).

The dots in the extracted dot image are projected in the longitudinal and lateral directions (indicated by the reference numeral 1003), and lines are drawn through the centers of gravity of the shapes thus obtained, so that grid lines to arrange the dots are obtained (indicated by the reference numeral 1004).

Once the grid lines are obtained, the additive information is extracted on the basis of whether there exits a dot near each intersection of the grid lines (indicated by the reference numerals 1005 and 1006).

Specifically, if there is a dot near an intersection, the digital data of "1" is assigned to the position of the intersection, whereas if there is no dot near an intersection, the digital data of "0" is assigned to the position of that intersection.

In this manner, the digital data of "1" and "0" are formed in the image having the grid lines formed therein, and the information of "1" and "0" is extracted as the additive information.

It should be noted that, if there are any non-extractable dots in the dot image generated by the dot image generation unit 302, the dot image may be enlarged or reduced by the dot state alteration unit 308 so that processing is performed to alter the dot image to enable the extraction of dots, and the dot image thus processed may be synthesized with the original image to generate a composite image.

Although the description above is made on the case where the dot verification unit 305 sends an original image and positional information of dots in a dot image to the dot positional relationship determination unit 50 to determine whether or not the dots can be extracted, the dot verification unit 305 may be provided with this function of the dot positional relationship determination unit 50 to determine whether or not the dots are extractable by comparing the positional relationships.

Further, it may be possible to have a configuration in which components having functions other than the function of the dot alteration unit 308, the components including the original image acquisition unit 10, the dot extraction unit 40, the dot positional relationship determination unit 50, and the image synthesizing unit 307, is separately provided in another device other than the image processing device that has the dot alteration unit 308, and the another device is connected to the image processing device through a communication circuit.

Next, referring to FIG. 11, description will be made of an image processing system in which the functions possessed by the original image acquisition unit 10, the dot extraction unit 40, the dot positional relationship determination unit 50, and the image synthesizing unit 307 are respectively provided in separate devices connected through a network.

Figure 11:
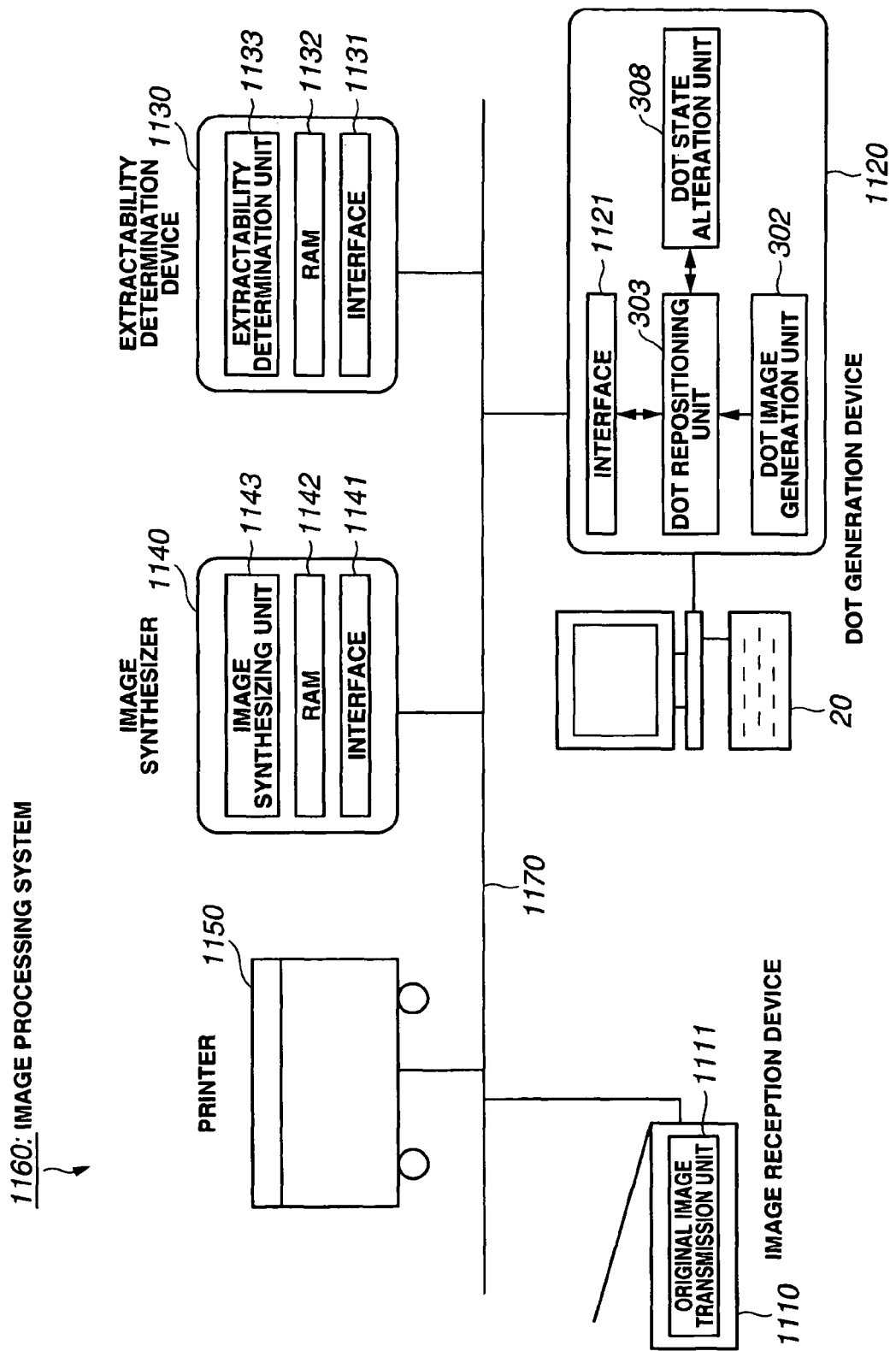
FIG. 11 is a schematic diagram showing an image processing system 1160.

FIG. 11 is a schematic diagram showing an image processing system 1160 in which the functions possessed by the original image acquisition unit 10, the dot extraction unit 40, the dot positional relationship determination unit 50, and the image synthesizing unit 307 are respectively provided in separate devices connected through a network.

As shown in FIG. 11, the image processing system 1160 has an image reception device 1110, a dot generation device 1120, an extractability determination device 1130, an image synthesizer 1140, and a printer 1150 connected to each other through a communication circuit 1170.

The image reception device 1110 is formed by a scanner for acquiring an original image, and has an original image transmission unit 1111.

The original image transmission unit 1111 transmits the acquired original image to the extractability determination device 1130.

The dot generation device 1120 has an additive information reception unit 20, a dot image generation unit 302, a dot repositioning unit 303, a dot state alteration unit 308, and an interface 1121.

The additive information reception unit 20 is formed by a keyboard that receives additive information input by the user.

The dot image generation unit 302 generates a dot image on the basis of the additive information received from the additive information reception unit 20.

Description of the dot image will be omitted here since it has already been made above.

The dot repositioning unit 303 performs processing to generate a dot image in which the state of dots is altered by the dot state alteration unit 308.

The dot state alteration unit 308 alters the state of dots in which the extractability determination device 1130 determines the dots to be not extractable from a composite image of an original image and a dot image.

As described before, the dot state alteration unit 308 has a displacement pattern memory unit 309, an original density detection unit 310, and a dot line alteration unit 311, and alters the state of dots by means of these components.

The interface 1121 is an interface that exchanges information with the extractability determination device 1130 through the communication circuit 1170. The interface 1121 transmits to the extractability determination device 1130 a dot image in which dots are already repositioned by the dot repositioning unit 303, and receives from the extractability determination device 1130 a dot image that is already determined to be not extractable and information specifying the positions of dots that cannot be extracted.

The extractability determination device 1130 has an interface 1131, a RAM (Random Access Memory) 1132, and an extractability determination unit 1133.

The interface 1131 is an interface that exchanges information with the dot generation device 1120 and the image synthesizer 1140 through the communication circuit 1170.

The interface 1131 receives a dot image from the dot generation device 1120, and transmits, to the dot generation device 1120, a dot image determined to be not extractable and information specifying the positions of dots that cannot not be extracted. The interface 1131 also transmits, to the image synthesizer 1140, a dot image determined to be extractable and an original image.

The RAM 1132 is a rewritable image memory that temporarily stores image data transmitted and received by the interface 1131.

The extractability determination unit 1133 has a function to determine whether or not dots can be extracted from a composite image formed by synthesizing the dot image transmitted by the dot generation device 1120 and the original image transmitted by the original reception device 1110.

The extractability determination unit 1133 is designed to determine the extractability of dots by actually superimposing and synthesizing the dot image and the original image to generate a composite image, and extracting dots from the composite image thus obtained.

Alternatively, the extractability determination unit 1133 may be designed to determine whether or not dots can be extracting by comparing the positional relationships between the dots in the dot image and the original image, as described with reference to FIGS. 4A and 4B.

The image synthesizer 1140 has an interface 1141, a RAM 1142, and an image synthesizing unit 1143.

The interface 1141 exchanges information with the image reception device 1110 and the printer 1150 through the communication circuit 1170.

The interface 1141 receives an original image and a dot image from the extractability determination device 1130, and transmits a composite image created by synthesizing the original image and the dot image.

The RAM 1142 is a rewritable image memory that temporarily stores image data received and transmitted by the interface 1141.

The image synthesizing unit 1143 generates a composite image by superimposing and synthesizing an original image and a dot image.

The printer 1150 is a printer that is connected to the communication circuit 1170 and prints out the composite image received from the image synthesizer 1140.

Using the image processing system 1160 configured as described above, the user places an original on the image reception device 1110, and inputs additive information to be added to the original by means of the additive information reception unit 20 of the dot image generation device.

Then, the original image is sent to the extractability determination device 1130.

A dot image is generated by the dot generation device 1120 on the basis of the additive information, and this dot image is also sent to the extractability determination device 1130.

The extractability determination device 1130 determines, on the basis of the received original image and dot image, whether or not dots can be extracted from the superimposingly synthesized image.

If it is determined that the dots cannot be extracted, a dot image in which the dot state is altered is regenerated by the dot state alteration unit 308 of the dot generation device 1120, and fed to the extractability determination device 1130.

The extractability determination device 1130 again determines the extractability, and the dot generation device 1120 continues the generation of a dot image until the extractability determination device 1130 determines that the dots can be extracted.

The original image and the dot image that is determined by the extractability determination device 1130 that the dots can be extracted are sent to the image synthesizer 1140, in which they are superimposingly synthesized.

The composite image generated by the image synthesizer 1140 is transmitted to the printer 1150, and is then printed out.

SECOND EXAMPLE

Next, description will be made of a Second Example in which the composite image generation unit 30 described with reference to FIG. 1 has a dot state alteration unit 308-1 having a function of altering the color of dots.

In the Second Example as well, as described with reference to FIGS. 2A to 2C, a composite image is generated by the composite image generation unit 30 provided in the system composed of the scanner 203 and the personal computer 204, or in the system comprising only the personal computer 205, or in the system formed by the image formation device.

Unlike the First Example, the composite image generation unit 30 is provided with a dot state alteration unit 308-1 having a function to alter the color of dots in addition to the function to alter the positions of dots, instead of the dot state alteration unit 308 for altering the positions of dots.

In the description of the Second Example, the components designated with the same reference numeral as those in the First Example basically have the same functions and configurations, and the description thereof will be omitted. However, the composite image generation unit 30 in the Second Example has a dot state alteration unit 308-1, unlike the composite image generation unit 30 in the First Example having the dot state alteration unit 308.

In the Second Example as well, the dot verification unit 305 may be designed, like the First Example, to verify the extractability of dots either by a method in which an original image having dots arranged therein is sent to the dot extraction unit 40 to verify the extractability of dots, or by a method in which an original image and positional information of dots in a dot image are sent to the dot positional relationship determination unit 50 so that the dot positional relationship determination unit 50 compares their positional relationships to verify the extractability of the dots.

First, description will be made of the dot state alteration unit 308-1 provided in the composite image generation unit 30.

Like the dot state alteration unit 308, the dot state alteration unit 308-1 alters the dots that are not extractable in a dot image generated by the dot image generation unit 302, but is different from the dot state alteration unit 308 in that the dot state alteration unit 308-1 has a function to alter the color of dots.

The dot state alteration unit 308-1 will be described with reference to FIG. 12.

Figure 12:
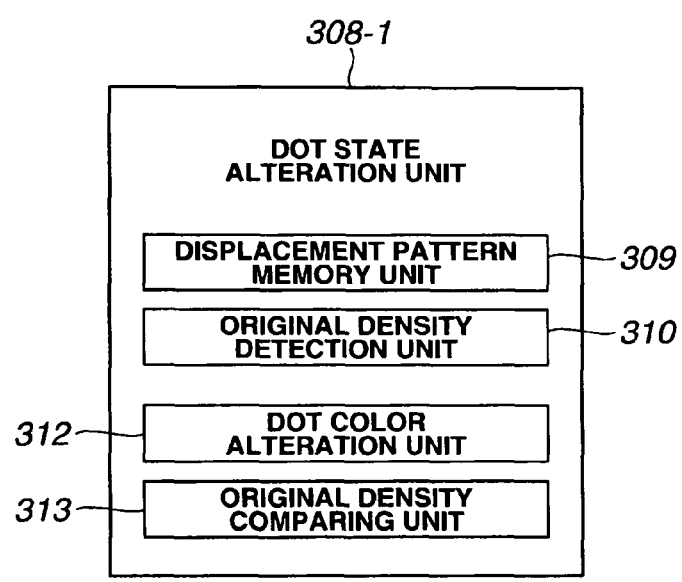
FIG. 12 is a block diagram showing a configuration of a dot state alteration unit 308-1.

As shown in FIG. 12, the dot state alteration unit 308-1 has a dot color alteration unit 312 in addition to a displacement pattern memory unit 309 and an original density detection unit 310.

The dot color alteration unit 312 has a function to alter the color of dots.

The dot image generation unit 302 generates dots in the color of black, whereas the dot color alteration unit 312 alters the color of dots that fall under predetermined conditions into white so as to enable extraction of the dots. If there is any dot that the dot verification unit 305 cannot extract, this dot is overlapped with the original image. Therefore, the color of the dots are changed from black to white to form white dots on the colored background of the original image, whereby these white dots can be extracted regardless of whether or not those dots are overlapped with the original image.

Next, description will be made, with reference to FIG. 13, of processing to generate a composite image by the composite image generation unit 30 having the dot state alteration unit 308-1.

Figure 13:
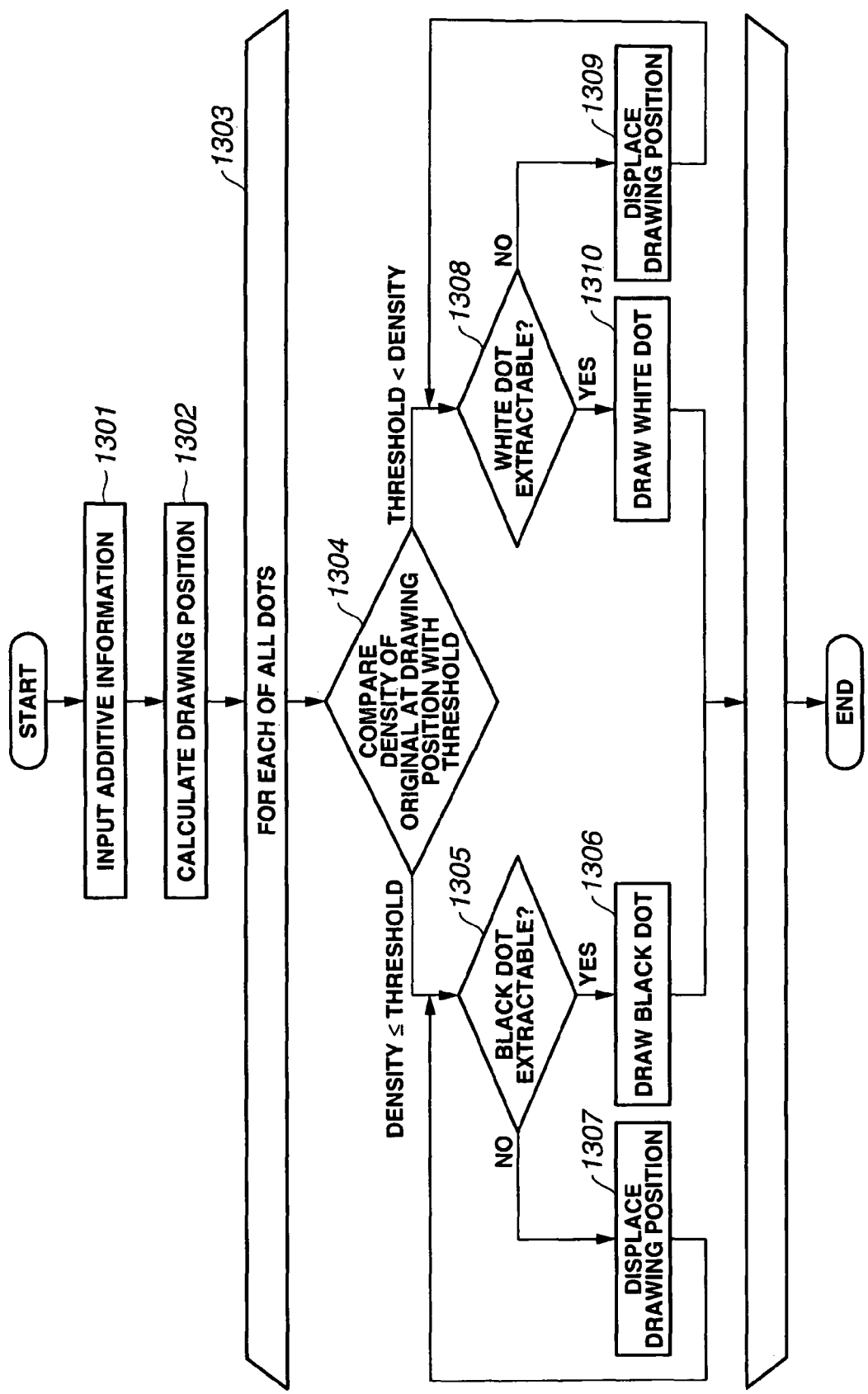
FIG. 13 is a flowchart showing processing to generate a composite image in a Second Example of the invention.

FIG. 13 is a flowchart showing processing to generate a composite image by the composite image generation unit 30 having the dot state alteration unit 308-1.

Upon acquiring additive information from the additive information reception unit 20 (step 1301), the dot image generation unit 302 generates a dot image on the basis of the additive information.

As described in the First Example with reference to FIG. 5, the processing to generate a dot image on the basis of the additive information is performed by a method in which the additive information is processed to be digitally represented by "0" and "1", the digitally processed additive information is drawn on paper (indicated by the reference numeral 502 in FIG. 5), and a dot image (indicated by the reference numeral 503) is generated such that dots are drawn at the positions corresponding to "1". The dots in the dot image thus generated are of black color.

When a dot image is generated in this manner (step 1302), the following processing is performed for each dot in the dot image (step 1303).

Specifically, the density of the original at a position where a dot is drawn on the original image when synthesized with the dot image is compared with a predetermined threshold value by the original density comparing unit 313 (step 1304).

If the original density at the position where the dot is drawn is equal to or lower than the predetermined threshold value (density ≤ threshold value in step 1304), the dot verification unit 305 checks whether or not the dot can be extracted from the dot image synthesized with the original image at the position where the dot is drawn (step 1305).

If the dot verification unit 305 determines that the dot can be extracted (YES in step 1305), the dot is not altered and keeps the same state where the dot is generated by the dot image generation unit 302 (step 1306).

In contrast, if the dot verification unit 305 determines in step 1305 that the dot cannot be extracted (NO in step 1305), the position of the dot is displaced to a position where extraction is possible by the displacement pattern memory unit 309 and the original density detection unit 310 (step 1307).

If the original density is equal to or higher than the predetermined threshold value in step 1304 (threshold value ≤ density in step 1304), the color of the dot is altered to white by the dot color alteration unit 312, and the dot verification unit 305 verifies whether or not the white dot can be extracted when overlapped with the original image (step 1308).

If the white dot is determined to be extractable (YES in step 1308), the dot is stored in the dot repositioning unit 303 in the state in which the dot is altered to white.

If the white dot is determined to be not extractable (NO in step 1308), the position of the dot is displaced by using the displacement pattern memory unit 309 and the original density detection unit 310 with the dot remaining white (step 1309).

The position of the white dot is displaced by using the original density detection unit 310 such that the original density detection unit 310 detects the density of the original in the vicinity of the position where the dot is drawn, and the white dot is displaced to a place where the original density is higher, unlike the case of a black dot.

The dots in the dot image generated by the dot image generation unit 302 are processed by the dot state alteration unit 308-1 as described above (step 1303).

Upon completion of the processing, the dot image having been processed and stored in the dot repositioning unit 303 is sent to the final dot memory unit 304, and a composite image is generated by the image synthesizing unit 307 by synthesizing the processed dot image with the original image.

Next, description will be made, with reference to FIG. 14, of processing to extract additive information from a composite image.

Figure 14:
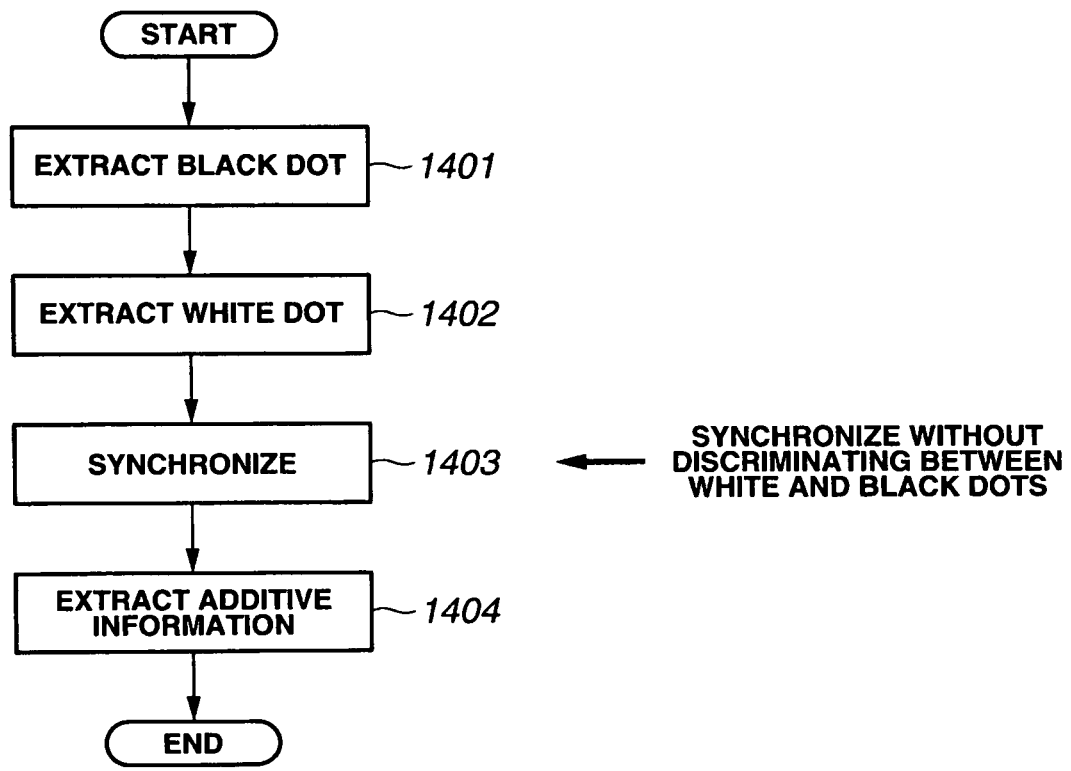
FIG. 14 is a flowchart showing processing to extract additive information from the composite image generated in the Second Example.

FIG. 14 is a flowchart showing processing to extract additive information from a composite image generated through the processing by the composite image generation unit 30 having the dot state alteration unit 308-1.

First, black dots are extracted from the composite image (step 1401).

Then, white dots, specifically white dots on the colored background, are extracted from the composite image (step 1402).

Upon completion of the extraction of the black and white dots, the extracted dots are projected in the longitudinal and lateral directions regardless of the difference in color (black or white). Then, as described in the First Example, lines are drawn through the centers of gravity of the shapes thus obtained, whereby grid lines are drawn on the image.

Once the grid lines are obtained, the digital data of "1" or "0" is assigned to each intersection of the grid lines on the basis of whether there exits the dot near the intersection, whereby the digital data of "1" and "0" are formed in the image (step 1403). This data is extracted as the additive information (step 1404).

Although the description of the Second Example has been made in terms of an example in which the dot color is altered from black to white by the dot color alteration unit 308-1, it is obvious that the dot color may be altered to any other color instead of white.

Further, although the description of the Second Example has been made in terms of an example in which the dot image generation unit 302 generates black dots, the generated dots may obviously be of any other color.

The dot state alteration unit 308-1 may be provided with a dot line alteration unit 311 to displace rows of dots.

Further, it may be possible to have a configuration in which components having functions other than the functions of the dot alteration unit 308-1, the components including the original image acquisition unit 10, the dot extraction unit 40, the dot positional relationship determination unit 50, and the image synthesizing unit 307, are separately provided in another device other than the image processing device that has the dot alteration unit 308-1, and the another device is connected to the image processing device through communication lines. In this case, the system of the Second Example has the same configuration as that of the image processing system 1160 described in the First Example, except that the system of the Second Example has the dot state alteration unit 308-1 instead of the dot state alteration unit 308 of the image processing system 1160.

THIRD EXAMPLE

Description will be made of a Third Example in which the composite image generation unit 30 described with reference to FIG. 1 is provided with a dot state alteration unit 308-2 having a function to alter the shape of dots.

In the Third Example as well, a composite image is generated by the composite image generation unit 30 provided in the system formed by the scanner 203 and the personal computer 204, or in the system formed only by the personal computer 205, or in the system formed by the image formation device, as described with reference to FIGS. 2A to 2C.

Unlike the First Example, the composite image generation unit 30 has a dot state alteration unit 308-2 having a function to alter the shape of dots, instead of the dot state alteration unit 308 for altering the positions of dots.

In the description of the Third Example, the components designated with the same reference numeral as those in the First Example basically have the same functions and configurations, and the description thereof will be omitted However, the composite image generation unit 30 in the Third Example has a dot state alteration unit 308-2, unlike the composite image generation unit 30 in the First Example having the dot state alteration unit 308.

Further, in the Third Example as well, the dot verification unit 305 may be designed, like the First Example, to verify the extractability of dots either by a method in which an original image having dots arranged therein is sent to the dot extraction unit 40 to verify the extractability of dots, or by a method in which an original image and positional information of dots in a dot image are sent to the dot positional relationship determination unit 50, and the dot positional relationship determination unit 50 compares their positional relationships to verify the extractability of the dots.

First, description will be made of the dot state alteration unit 308-2 provided in the composite image generation unit 30.

Like the dot state alteration unit 308, the dot state alteration unit 308-2 alters the dots that cannot be extracted when a dot image generated by the dot image generation unit 302 overlaps with an original image, but is different from the dot state alteration unit 308 in that the dot state alteration unit 308-1 has a function to alter the shape of dots.

Figure 15:
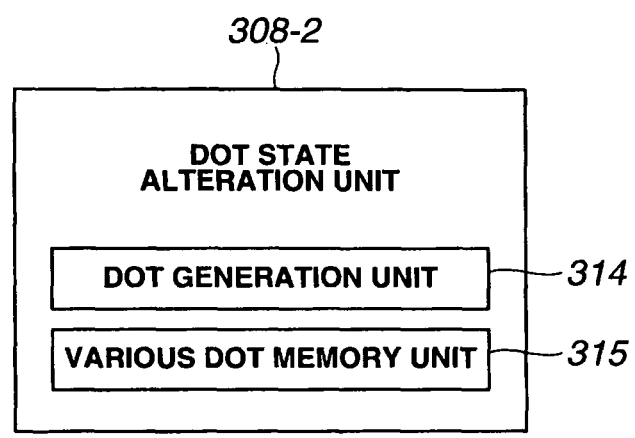
FIG. 15 is a block diagram showing a configuration of a dot state alteration unit 308-2.

Referring to FIG. 15, the dot state alteration unit 308-2 will be described.

As shown in FIG. 15, the dot state alteration unit 308-2 has a dot creation unit 314, and a various dot memory unit 315.

The dot creation unit 314 has a function to create shapes of dots.

The various dot memory unit 315 stores various shapes of dots.

Next, with reference to FIG. 16, description will be made of processing to generate a composite image by the composite image generation unit 30 having the dot state alteration unit 308-2.

Figure 16:
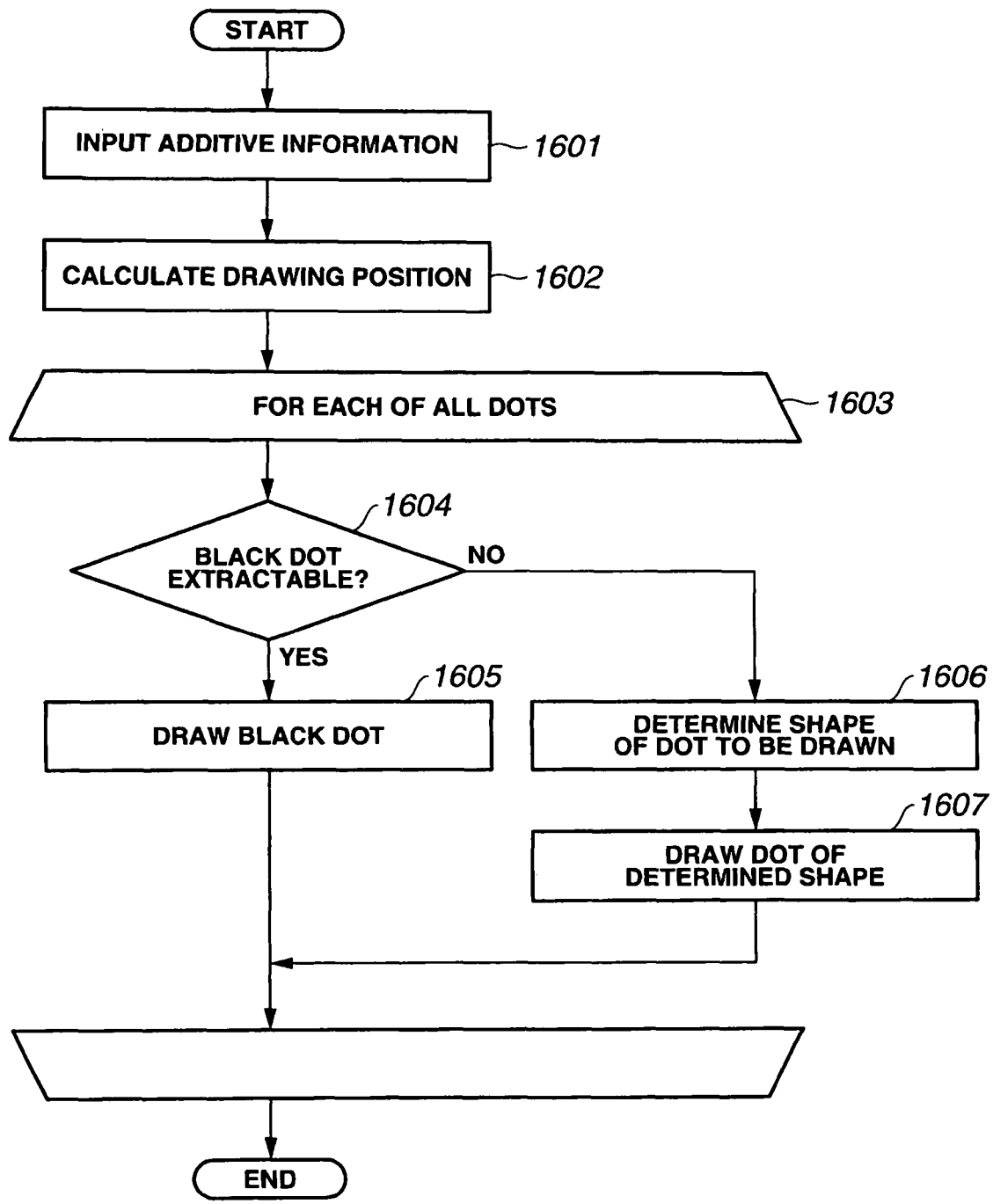
FIG. 16 is a flowchart showing processing to generate a composite image in a Third Example of the invention.

As shown in FIG. 16, once additive information is acquired by the additive information reception unit 20 (step 1601), the dot image generation unit 302 generates a dot image on the basis of the additive information.

As described in the First Example with reference to FIG. 5, the processing to generate a dot image on the basis of additive information is performed by a method in which the additive information is processed to be digitally represented by "0" and "1"; the digitally processed additive information is drawn on paper (indicated by the reference numeral 502 in FIG. 5); and a dot image (indicated by the reference numeral 503) is generated such that dots are drawn at the positions corresponding to "1."

Once the dot image is generated in this manner (step 1602), the following processing is performed for each dot in the dot image (step 1603).

Specifically, a dot to be processed is first synthesized with an original image, and then the dot verification unit 305 verifies whether or not the dot to be processed can be extracted from the synthesized composite image (step 1604).

If the dot verification unit 305 determines that the dot can be extracted (YES in step 1604), the dot is not altered and keeps the state where the dot is generated by the dot image generation unit 302 (step 1605).

In contrast, if the dot verification unit 305 determines in step 1604 that the dot cannot be extracted (NO in step 1604), the dot is processed by the dot state alteration unit 308-2.

Specifically, a different dot shape is determined by the dot creation unit 314 or the various dot memory unit 315 (step 1606), and the determined different dot shape is stored in the dot repositioning unit 303, and dots having the determined different shape is drawn (step 1607).

Processing by the dot creation unit 314 will be described. In the processing, attention is paid to the overlap between the original image and a dot to be processed in the dot image, and a double-size dot is created so as to be able to be extracted even if it is overlapped with the original image. Alternatively, by removing a dot portion that overlaps with the original image, a dot is created such that the created dot is formed by a dot portion that does not overlap with the original image.

Several different shapes of dots are stored in the various dot memory unit 315.

These shapes include, for example, a star shape, a rectangular shape, and a triangular shape.

These dots are respectively arranged at positions where dots to be processed are arranged. Additionally, the type of dot is selected such that the dot shapes can be extracted even if overlapped with the original image.

In this manner, the dot state alteration unit 308-2 performs processing for each dot of the dot image generated by the dot image generation unit 302 (step 1603).

Upon completion of the processing, the dot image having been processed and stored in the dot repositioning unit 303 is sent to the final dot memory unit 304, and the image synthesizing unit 307 generates a composite image by synthesizing the processed dot image with the original image.

Next, with reference to FIG. 17, description will be made of processing to extract additive information from the composite image.

Figure 17:
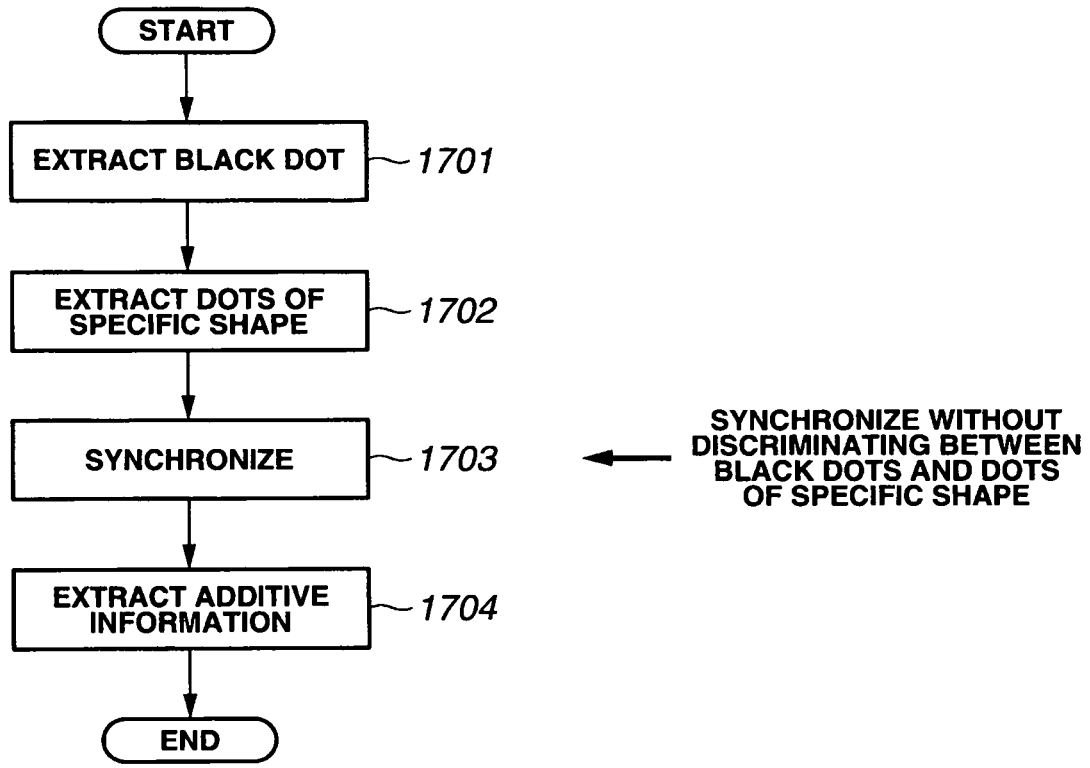
FIG. 17 is a flowchart showing processing to extract additive information from the composite image generated in the Third Example.

FIG. 17 is a flowchart showing processing to extract additive information from a composite image generated by the composite image generation unit 30 having the dot state alteration unit 308-2.

In the first place, instead of the dots having a different shape determined by the dot state alteration unit 308-2, black dots generated by the dot image generation unit 302 are extracted from the composite image (step 1701).

Then, the dot extraction unit 40 extracts the dots having the different shape from the composite image (step 1702).

Then, grid lines are formed by the black dots extracted in step 1701 and the differently shaped dots extracted in step 1702. The difference between the extracted black dots and the differently shaped dots is not taken into consideration to form the grid lines for the extracted dots.

Specifically, the black dots extracted in step 1701, and the dots that are extracted in step 1702 and whose shape are returned to that of black dots are projected in the longitudinal and lateral directions relative to the dot image.

Lines are drawn through the centers of gravity of the projected shapes, whereby grid lines having the dots arranged are obtained.

Once the grid lines are obtained, the additive information is extracted on the basis of whether there exits a dot near each intersection of the grid lines (steps 1703 and 1704).

Furthermore, it may be possible to have a configuration in which components having functions other than function of the dot state alteration unit 308-2, such as the original image acquisition unit 10, the dot extraction unit 40, the dot positional relationship determination unit 50, and the image synthesizing unit 307, are separately provided in another device other than the image processing device that has the dot alteration unit 308-2, and this another device is connected to the image processing device through the communication lines. In this case, the system has the same configuration as that of the image processing system 1160 described in the First Example, except that the system of the Third Example has the dot state alteration unit 308-2 instead of the dot state alteration unit 308 of the image processing system 1160.

The present invention is applicable to an image processing device, an image processing system, an image processing method, a recording medium storing a program, and a data signal.

The image processing program according to the present invention may be provided not only by communication means but also by being recorded on a recording medium such as a CD-ROM.

The foregoing description of the exemplary embodiments of the present invention is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
an original reception unit that receives an original image;
a dot image generation unit that generates, on the basis of additive information to be added to the original image, a dot image in which a plurality of dots each formed by one or more pixels are arranged;
a determination unit that determines, from a relationship between a position on the dot image and a corresponding position on the original image, whether or not the dots in the dot image can be extracted, on the basis of the original image received by the original reception unit and the dot image generated by the dot image generation unit;
a state alteration unit that, when the determination unit determines that any of the dots in the dot image cannot be extracted, alters a state of the non-extractable dot in the dot image; and
a composite image generation unit that generates a composite image by superimposing, on the original image, the dot image having the state of the non-extractable dot altered by the state alteration unit, wherein
the determination by the determination unit is executed before the composite image generated by the composite image generation unit is printed on a recording medium,
the dot image generated by the dot image generation unit has a plurality of dots arranged in a line, the plurality of dots each being formed by one or more pixels,
the state alteration unit displaces, in a substantially parallel direction, positions of the plurality of dots aligned on the line, and
the plurality of dots being displaced includes dots that are determined to be extractable by the determination unit.

2. The image processing device as claimed in claim 1, wherein
the state alteration unit comprises an alteration position memory unit that stores a destination position to which a position of the non-extractable dot in the dot image is altered, and, when there exists the non-extractable dot, alters the position of the non-extractable dot to the destination position stored in the alteration position memory unit.

3. The image processing device as claimed in claim 1, wherein
the alteration position memory unit stores a plurality of destination positions of the non-extractable dot in prescribed sequence by unit of pixel, and
the state alteration unit alters the position of the non-extractable dot in accordance with the prescribed sequence until the non-extractable dot becomes extractable.

4. The image processing device as claimed in claim 1, further comprising a density distribution detection unit that detects density distribution in the original image around the position of each dot,
wherein the state alteration unit displaces the position of the non-extractable dot to a position where density is lower on the basis of the density distribution detected by the density distribution detection unit.

5. The image processing device as claimed in claim 1, wherein
the state alteration unit displaces positions of a plurality of dots aligned on a lateral line relative to the original image in a longitudinal direction relative to the original image, or displaces positions of a plurality of dots aligned on a longitudinal line relative to the original image in a lateral direction relative to the original image.

6. The image processing device as claimed in claim 1, wherein
the state alteration unit comprises a color alteration unit that alters the color of the non-extractable dots when any of the dots is not extractable.

7. The image processing device as claimed in claim 6, wherein
the dots generated by the dot image generation unit have a black color, and the color alteration unit alters the color of the non-extractable dots into white.

8. The image processing device as claimed in claim 1, wherein
the state alteration unit comprises a shape alteration unit that alters a shape of the non-extractable dots when any of the dots is not extractable.

9. The image processing device according to claim 1, wherein the non-extractable dots overlap at least a portion of a dot formed in the original image and the extractable dots do not overlap any dot formed in the original image.

10. An image processing system comprising an original reception device that receives an original image, a dot generation device, a determination device, and an image synthesizer, wherein:
the original reception device includes an original image transmission unit that transmits the received original image to the dot generation device;
the dot generation device includes a dot image generation unit that generates a dot image in which a plurality of dots each formed by one or more pixels are arranged, on the basis of additive information to be added to the original image transmitted by the original image transmission unit;
the determination device includes a determination unit that determines, from a relationship between a position on the dot image and a corresponding position on the original image, whether or not the dots in the dot image can be extracted, on the basis of the original image received by the original reception unit and the dot image generated by the dot image generation unit;
the dot generation device further includes a state alteration unit that, when the determination unit determines that any of the dots in the dot image cannot be extracted, alters a state of the non-extractable dot in the dot image; and
the image synthesizer includes a composite image generation unit that generates a composite image by superimposing, on the original image, the dot image having the state of dots altered by the state alteration unit, wherein
the determination by the determination unit is executed before the composite image generated by the composite image generation unit is printed on a recording medium,
the dot image generated by the dot image generation unit has a plurality of dots arranged in a line, the plurality of dots each being formed by one or more pixels,
the state alteration unit displaces, in a substantially parallel direction, positions of the plurality of dots aligned on the line, and
the plurality of dots being displaced includes dots that are determined to be extractable by the determination unit.

11. The image processing system as claimed in claim 10, further comprising a printer that prints out a composite image generated by the composite image generation unit.

12. An image processing method, comprising:
receiving an original image;
generating, on the basis of additive information to be added to the original image, a dot image in which a plurality of dots each formed by one or more pixels are arranged, wherein the dot image has a plurality of dots arranged in a line, the plurality of dots each being formed by one or more pixels;
determining, from a relationship between a position on the dot image and a corresponding position on the original image, whether or not the dots in the dot image can be extracted, on the basis of the received original image and the generated dot image;
when any of the dots in the dot image cannot be extracted, altering a state of the non-extractable dot in the dot image;
displacing, in a substantially parallel direction, positions of the plurality of dots aligned on the line, wherein the plurality of dots being displaced includes dots that are determined to be extractable; and
generating a composite image by superimposing, on the original image, the dot image having the state of the non-extractable dot altered,
wherein the determination is executed before the generated composite image is printed on a recording medium.

13. The image processing method according to claim 12, wherein the non-extractable dots overlap at least a portion of a dot formed in the original image and the extractable dots do not overlap any dot formed in the original image.

14. A non-transitory computer readable recording medium storing an image processing program that causes a computer to execute a process, the process comprising:
receiving an original image;
generating, on the basis of additive information to be added to the original image, a dot image in which a plurality of dots each formed by one or more pixels are arranged, wherein the dot image has a plurality of dots arranged in a line, the plurality of dots each being formed by one or more pixels;
determining, from a relationship between a position on the dot image and a corresponding position on the original image, whether or not the dots in the dot image can be extracted, on the basis of the received original image and the generated dot image;
when any of the dots in the dot image cannot be extracted, altering a state of the non-extractable dot in the dot image;
displacing, in a substantially parallel direction, positions of the plurality of dots aligned on the line, wherein the plurality of dots being displaced includes dots that are determined to be extractable; and
generating a composite image by superimposing, on the original image, the dot image having the state of the non-extractable dot altered,
wherein the determination is executed before the generated composite image is printed on a recording medium.

15. The non-transitory computer readable recording medium according to claim 14, wherein the non-extractable dots overlap at least a portion of a dot formed in the original image and the extractable dots do not overlap any dot formed in the original image.

* * * * *